United States Patent Office 3,658,950
Patented Apr. 25, 1972

3,658,950
THERMOPLASTIC RESIN CONTAINING STYRENE-ACRYLONITRILE COPOLYMER AND CHLORINATED POLYETHYLENE
Elio Eusebi, Troy, Mich., assignor to General Motors Corporation, Detroit, Mich.
No Drawing. Filed May 27, 1969, Ser. No. 828,391
Int. Cl. C08f 41/12
U.S. Cl. 260—897 C
2 Claims

ABSTRACT OF THE DISCLOSURE

An inexpensive impact resistant thermoplastic resin made up of a blend of styrene-acrylonitrile copolymer and chlorinated polyethylene. The chlorinated polyethylene contains 30–40% by weight chlorine and constitutes up to about 45% by volume of the resin product.

This invention relates to tough thermoplastic resins having impact strengths and heat deflection temperatures comparing favorably with the widely used acrylonitrile-butadiene-styrene (ABS) resins, but of lower cost. More particularly this invention relates to certain novel thermoplastic resin compositions containing styrene-acrylonitrile copolymer and suitable chlorinated polyethylenes.

Thermoplastic resins having suitable heat distortion temperatures and impact resistance have found wide acceptance in commerce because they can be readily molded into tough, durable articles. In view of the acceptance of resins such as ABS resins, there is further demand for moldable, inexpensive resins having comparable or superior physical properties.

Accordingly, it is an object of the present invention to provide a low cost, impact resistant thermoplastic resin employing styrene-acrylonitrile copolymer and a relatively inexpensive elastomeric material, chlorinated polyethylene which will provide impact resistance without seriously lowering the heat distortion temperature.

In accordance with the preferred embodiment of my invention, this and other objects are accomplished by mechanically blending granular styrene-acrylonitrile copolymer with a suitable chlorinated polyethylene in powdered form in an amount such that the elastomeric phase, chlorinated polyethylene, comprises up to 45% by volume of the finished resin product. In general, mixtures of styrene-acrylonitrile copolymer and chlorinated polyethylene in the proportions defined have impact resistant properties and heat deflection temperatures as determined by conventional ASTM tests which are at least comparable to and frequently superior to commercial ABS resins. However, in order to achieve these properties suitable chlorinated polyethylene compositions must be employed. The critical characteristics of the chlorinated polyethylene elastomer are its chlorine content and its melt viscosity. Suitable chlorinated polyethylenes are those containing 30–40% by weight chlorine and having a melt viscosity in the range of 10,000 to 25,000 poises when determined as will be described. Such elastomers may be blended with styrene-acrylonitrile copolymer to provide a relatively inexpensive but tough, durable molded part.

These and other objects and advantages of my invention will be better understood after a more complete description of the invention which follows.

Styrene-acrylonitrile copolymers are well known and widely used synthetic plastic resins. They are typically formed by conventional emulsion polymerization techniques and for the purposes of the present invention preferably consist of 72–80% by weight styrene and the balance acrylonitrile.

Chlorinated polyethylenes of varying chlorine contents are commercial products generally produced by chlorinating an aqueous slurry of powdered Ziegler polyethylene. They are generally elastomeric materials and have been widely used in mixtures with poly(vinyl chloride). For purposes of the present invention, I employ chlorinated polyethylene as an elastomeric second phase in mixture with styrene-acrylonitrile copolymer resins to improve the impact resistance of the synthetic resin without adversely affecting its useful high heat deflection temperature. While commercial chlorinated polyethylenes may contain anywhere from 10% to about 70% chlorine, I have found that only those materials containing 30–40% chlorine by weight are useful in the thermoplastic of my invention when such elastomers also have a suitable melt viscosity. In this regard chlorinated polyethylenes having a melt viscosity in the range of about 10,000 to 25,000 poises are required for use in my thermoplastic resin composition. These values of melt viscosity were determined at 190° C. employing a 0.05" x 2" capillary tube and an apparent shear rate of 100 seconds$^{-1}$. Chlorinated polyethylene elastomers are blended with styrene-acrylonitrile copolymer in amounts such that the elastomer phase comprises up to 45% by volume of the resin product. The chlorinated polyethylene content is expressed in terms of volume because the contribution of the elastomeric phase to improve in impact property and other desirable properties of the resin product is believed to be a volumetric effect. However, to achieve particularly superior properties in my thermoplastic resin product such a product contains 25–45% by volume of the elastomer component. In the practice of my invention one may convert the composition of the thermoplastic resin expressed in parts by volume to the corresponding composition expressed in parts by weight simply by multiplying the known or desired volume percent of each of the resin components by its respective specific gravity to obtain a value in parts by weight and dividing this value for each component by the total parts by weight.

A few specific examples may further illustrate my invention. In the following examples a styrene-acrylonitrile copolymer in granular form was employed consisting of 29.5% by weight acrylonitrile and the balance styrene. The copolymer had a limiting solution viscosity in tetrahydrofuran at 25° C. of 0.825.

In the first example a commercial chlorinated polyethylene containing 36% by weight chlorine and having a melt viscosity as defined above of 24,000 poises was employed. The chlorinated polyethylene in powder form and granulated styrene-acrylonitrile were mixed with about 1% calcium stearate, in proportions such that the chlorinated polyethylene comprised 35% of the total volume. The mixed powders were dried for two hours at 185° F. and then molded using a Newberry injection molding machine wherein the back pressure was set at 200 p.s.i. and the screw speed set at 200 r.p.m. The mixing action of the screw feeder was sufficient to mechanically blend the material and to heat it to a moldable condition. Bars were molded having dimensions of ½" x ½" x 5", Izod impact strength samples were prepared by cutting the molded bar in half and notching per ASTM D–256–56 procedure. All samples were subjected to physical tests after allowing the bars to stand one day. Heat deflection temperature tests were run at 264 p.s.i. as per ASTM D–648–56 procedure. This material displayed a notched Izod impact of 4.78 foot pounds per inch and a heat deflection temperature at 264 p.s.i. of 92.3° C. A typical high impact strength conventional ABS resin was tested in a similar manner and found to have a notched Izod impact of 4.5 foot pounds per inch and a heat deflection temperature at 264 p.s.i. of 82° C. It is seen that the styrene-acrylonitrile-chlorinated polyethylene thermoplastic resin of this example has impact properties equivalent to those of high impact conventional ABS resins and has a substantially higher heat deflection temperature therefore increasing its useful temperature range. In addition, the subject thermoplastic resin is considerably less expensive than ABS resins in view of the relative costs of chlorinated polystyrene and polybutadiene.

In a second example the same styrene-acrylonitrile and chlorinated polyethylene were employed except that the amount of chlorinated polyethylene was increased to 40% by volume of the total resin. Molded, tested specimens of this material were found to have a notched Izod impact of 7.4 foot pounds per inch and a heat deflection temperature at 264 p.s.i. of 91.7° C.

In a further example, chlorinated polyethylene was employed having a melt viscosity at 190° C. of 19,000 poises and a chlorine content of 48% by weight. This material in powder form was mixed with granulated styrene-acrylonitrile copolymer as above and molded into test specimens in an amount such that the elastomer would comprise 35% by volume of the molded resin. Upon physical testing it was found that this material displayed a notched Izod impact of 0.9 foot pound per inch and a heat deflection temperature at 264 p.s.i. of 91.9° C. It is noted that with this high chlorine content chlorinated polyethylene the impact strength was decreased to value generally unsuitable for applications in which high impact ABS resins are typically employed.

In a still further example chlorinated polyethylene was employed having a melt viscosity at 190° C. of 15,000 poises and a chlorine content of 36% by weight. This material in powder form was mixed with granulated styrene-acrylonitrile copolymer as above and molded into test specimens in an amount such that the elastomer made up 35% by volume of the molded resin. Upon subsequent physical testing, as above, it was found that this material displayed a notched Izod impact of 2.3 foot pounds per inch and a heat deflection temperature at 264 p.s.i. of 93.4° C. This material is suitable for use in many applications in which ABS resins are now employed.

Thus, I have found that an inexpensive, tough thermoplastic resin may be formed by mixing styrene-acrylonitrile copolymer with suitable quantities of chlorinated polyethylene when the chlorinated polyethylene contains 30–40% by weight chlorine and has a melt viscosity of 10,000 to 25,000 poises at 190° C.

While my invention has been described in terms of a few specific embodiments it is appreciated that other forms could readily be adapted by one skilled in the art and accordingly the scope of my invention is to be considered limited only by the following claims.

I claim:
1. A tough impact resistant synthetic thermoplastic resin consisting essentially of styrene-acrylonitrile copolymer and chlorinated polyethylene, said chlorinated polyethylene containing about 30 to 40% by weight chlorine and having a melt viscosity of 10,000 to 25,000 poises, said thermoplastic resin containing about 25% to 45% by volume of said chlorinated polyethylene.

2. A tough impact resistant synthetic thermoplastic resin consisting essentially of styrene-acrylonitrile copolymer and chlorinated polyethylene, said chlorinated polyethylene containing about 30% to 40% by weight chlorine and having a melt viscosity of 10,000 to 25,000 poises, said thermoplastic resin containing about 25% to 45% by volume of said chlorinated polyethylene, said styrene-acrylonitrile copolymer containing about 72%–80% by weight styrene.

References Cited
UNITED STATES PATENTS 3,409,706  11/1968  Frey et al. _____ 260—897
3,158,665  11/1964  Herbig et al. _____ 260—897

MURRAY TILLMAN, Primary Examiner

C. J. SECCURO, Assistant Examiner

U.S. Cl. X.R.

260—23 XA, 23 S